United States Patent
Paluch et al.

(10) Patent No.: US 12,088,502 B2
(45) Date of Patent: Sep. 10, 2024

(54) ADAPTIVE NETWORK CONTROL OF TRAFFIC FLOWS IN A SECURE NETWORK

(71) Applicant: INTERNATIONAL BUSINESS MACHINES CORPORATION, Armonk, NY (US)

(72) Inventors: Michal Paluch, Cracow (PL); Oleksii Tosov, Cracow (PL); Szymon Kowalczyk, Cracow (PL); Marcel Butucea Panait, Brno (CZ)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 17/643,498

(22) Filed: Dec. 9, 2021

(65) Prior Publication Data

US 2023/0188470 A1 Jun. 15, 2023

(51) Int. Cl.
*H04L 47/2425* (2022.01)
*G06N 20/00* (2019.01)
*H04L 41/16* (2022.01)
*H04L 47/2441* (2022.01)

(52) U.S. Cl.
CPC ......... *H04L 47/2425* (2013.01); *G06N 20/00* (2019.01); *H04L 41/16* (2013.01); *H04L 47/2441* (2013.01)

(58) Field of Classification Search
CPC . H04L 47/10; H04L 47/2425; H04L 47/2441; H04L 41/16
See application file for complete search history.

(56) References Cited

U.S. PATENT DOCUMENTS

| | | | | |
|---|---|---|---|---|
| 10,700,984 | B2 * | 6/2020 | Savalle | H04L 43/04 |
| 10,735,891 | B1 | 8/2020 | Trim | |
| 2012/0281590 | A1 * | 11/2012 | Szabo | H04L 43/026 |
| | | | | 370/253 |
| 2013/0100849 | A1 | 4/2013 | Szabo | |
| 2013/0148513 | A1 * | 6/2013 | Szabo | H04L 41/142 |
| | | | | 370/252 |

(Continued)

FOREIGN PATENT DOCUMENTS

| | | | | |
|---|---|---|---|---|
| CN | 113114573 A | | 7/2021 | |
| EP | 2521312 A2 * | | 11/2012 | ........... H04L 41/145 |

(Continued)

*Primary Examiner* — Kostas J Katsikis
(74) *Attorney, Agent, or Firm* — Jared C. Chaney (57) ABSTRACT

A method is provided for rate limiting in a network. The method comprises receiving a traffic flow from the network. In a supervised learning phase, and determining if the traffic flow matches a pretrained network flow model. If so, the method comprises designating the traffic flow as a classified traffic flow according to the pretrained network flow model. The method further comprises advancing to a grouping phase, conditioned upon the traffic flow not matching pretrained network flow models. In the unsupervised learning phase, the method comprises designating the traffic flow as a classified traffic flow. In the grouping phase that follows the supervised learning phase and the unsupervised learning phase, the method comprises using side information about the traffic flows to assign related traffic flows into traffic flow groups, identifying a particular traffic flow group from the traffic flow groups as being an offending traffic flow group.

20 Claims, 7 Drawing Sheets

(56) References Cited

U.S. PATENT DOCUMENTS

| | | | |
|---|---|---|---|
| 2016/0285753 A1 | 9/2016 | Guleria | |
| 2019/0265971 A1 | 8/2019 | Behzadi | |
| 2020/0236112 A1* | 7/2020 | Pularikkal | H04L 63/1425 |
| 2020/0259753 A1 | 8/2020 | Ma | |
| 2021/0203615 A1* | 7/2021 | Roy | G06N 20/00 |
| 2021/0367871 A1* | 11/2021 | Musa | H04L 69/322 |
| 2022/0303290 A1* | 9/2022 | Baidya | H04L 63/1441 |

FOREIGN PATENT DOCUMENTS

| | | | | |
|---|---|---|---|---|
| EP | 2584496 A1 * | 4/2013 | | G06K 9/6218 |
| WO | 2019170396 A1 | 9/2019 | | |

* cited by examiner

ADAPTIVE NETWORK CONTROL OF TRAFFIC FLOWS IN A SECURE NETWORK

BACKGROUND

Disclosed herein is a system and related method for adaptive network slicing of traffic flows in a secure network.

Enterprise information technology (IT) environments are highly depended on the optimal operation of their network infrastructure. This not only facilitates the connectivity to internet business supporting services, but also ensures the integration of existing systems across in-house and cloud deployments. Today's networks are becoming more complex and the interoperability between heterogeneous systems is more difficult to achieve. The complexity of IT infrastructure management is a result of the plethora of critical business services delivered across different types of infrastructure implementations, such as software as a service, public cloud, hybrid cloud solutions, and/or IoT networked devices. As the systems are evolving to be more flexible and dynamic, network management becomes harder to manage and optimize without the ability to self-organize and learn.

SUMMARY

According to one aspect disclosed herein, a computer-implemented method is provided for rate limiting in a network, comprising receiving a traffic flow from the network. In a supervised learning phase, the method comprises determining if the traffic flow matches a pretrained network flow model. Conditioned upon the traffic flow matching the pretrained network flow model, designating the traffic flow as a classified traffic flow according to the pretrained network flow model using a network traffic flow classifier. The method further comprises advancing to a grouping phase, conditioned upon the traffic flow not matching pretrained network flow models, advancing to an unsupervised learning phase. In the unsupervised learning phase that follows the supervised learning phase, designating the traffic flow as a classified traffic flow according to a clustering analysis on the traffic flow and previous traffic flows. The supervised learning phase and the unsupervised learning phase result in classified individual traffic flows. In the grouping phase that follows the supervised learning phase and the unsupervised learning phase, using side information about the traffic flows to assign related traffic flows into traffic flow groups, identifying a particular traffic flow group from the traffic flow groups as being an offending traffic flow group, and enforcing rate limiting in a next evaluation period for the offending traffic flow group.

A related system for implementing the method, and a computer program product for implementing the method are also disclosed.

The computer program product contains instructions that are, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following general acronyms may be used below:

TABLE 1

| General Acronyms | |
|---|---|
| API | application program interface |
| ARM | advanced RISC machine |
| CD-ROM | compact disc ROM |
| CPU | central processing unit |
| DPS | data processing system |
| DVD | digital versatile disk |
| EPROM | erasable programmable read-only memory |
| FPGA | field-programmable gate arrays |
| HA | high availability |
| IaaS | infrastructure as a service |
| I/O | input/output |
| IPL | initial program load |
| ISP | Internet service provider |
| ISA | instruction-set-architecture |
| LAN | local-area network |
| LPAR | logical partition |
| PaaS | platform as a service |
| PDA | personal digital assistant |
| PLA | programmable logic arrays |
| RAM | random access memory |
| RISC | reduced instruction set computer |
| ROM | read-only memory |
| SaaS | software as a service |
| SLA | service level agreement |
| SRAM | static random-access memory |
| WAN | wide-area network |

TABLE 1-continued

General Acronyms

Data Processing System in General

Figure 1A:
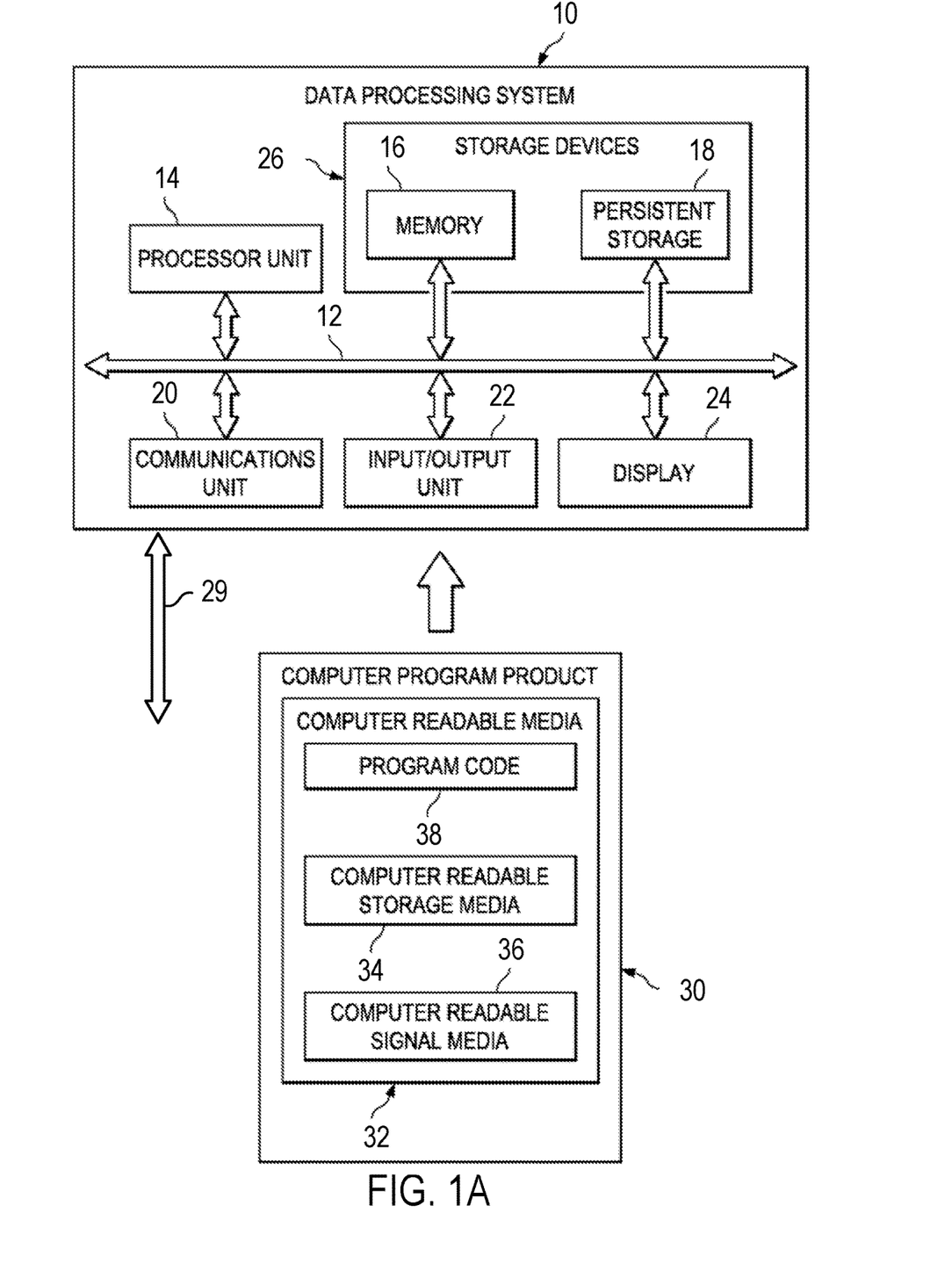
FIG. 1A is a block diagram of a data processing system (DPS) according to one or more embodiments disclosed herein.

FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
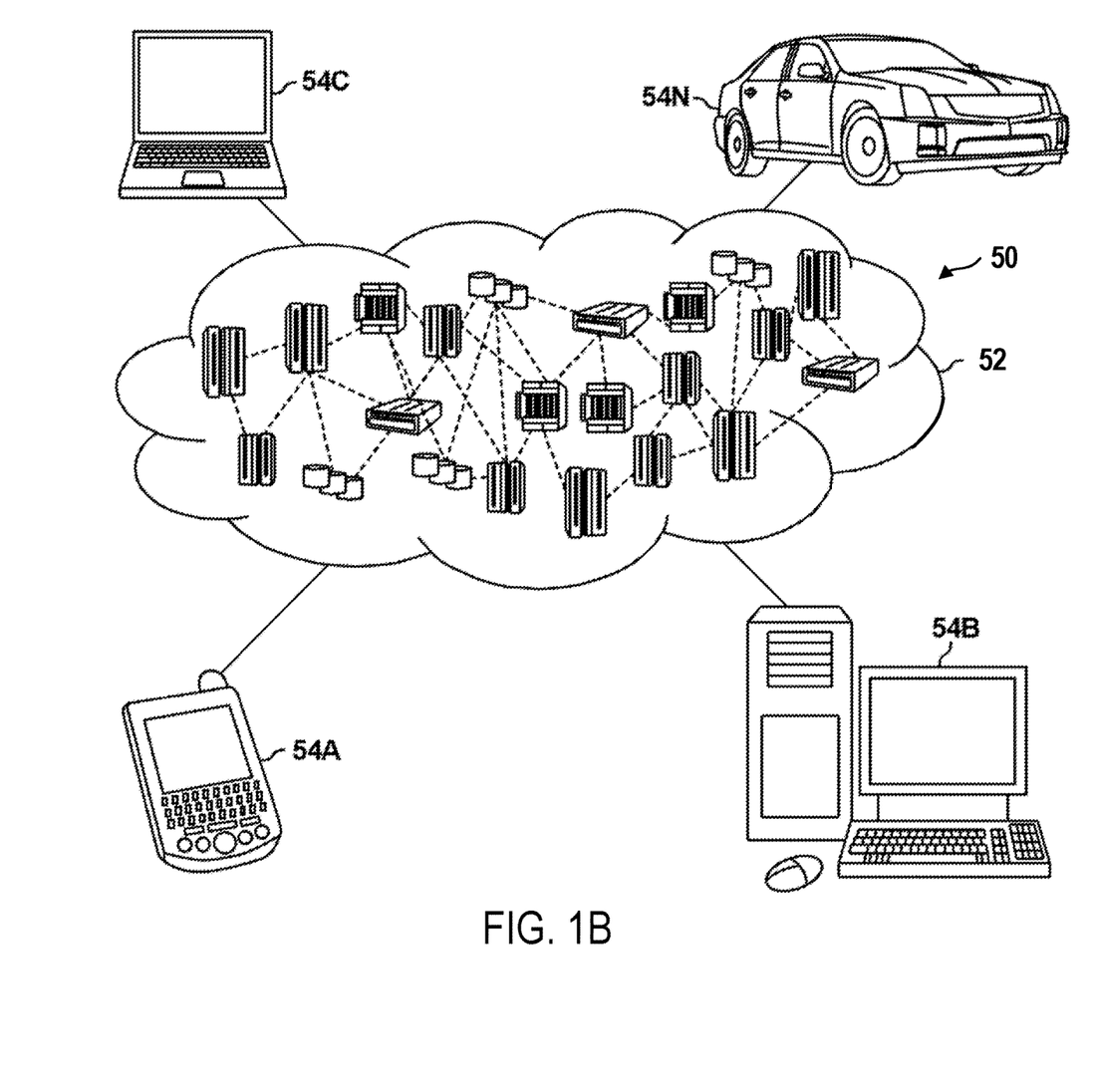
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
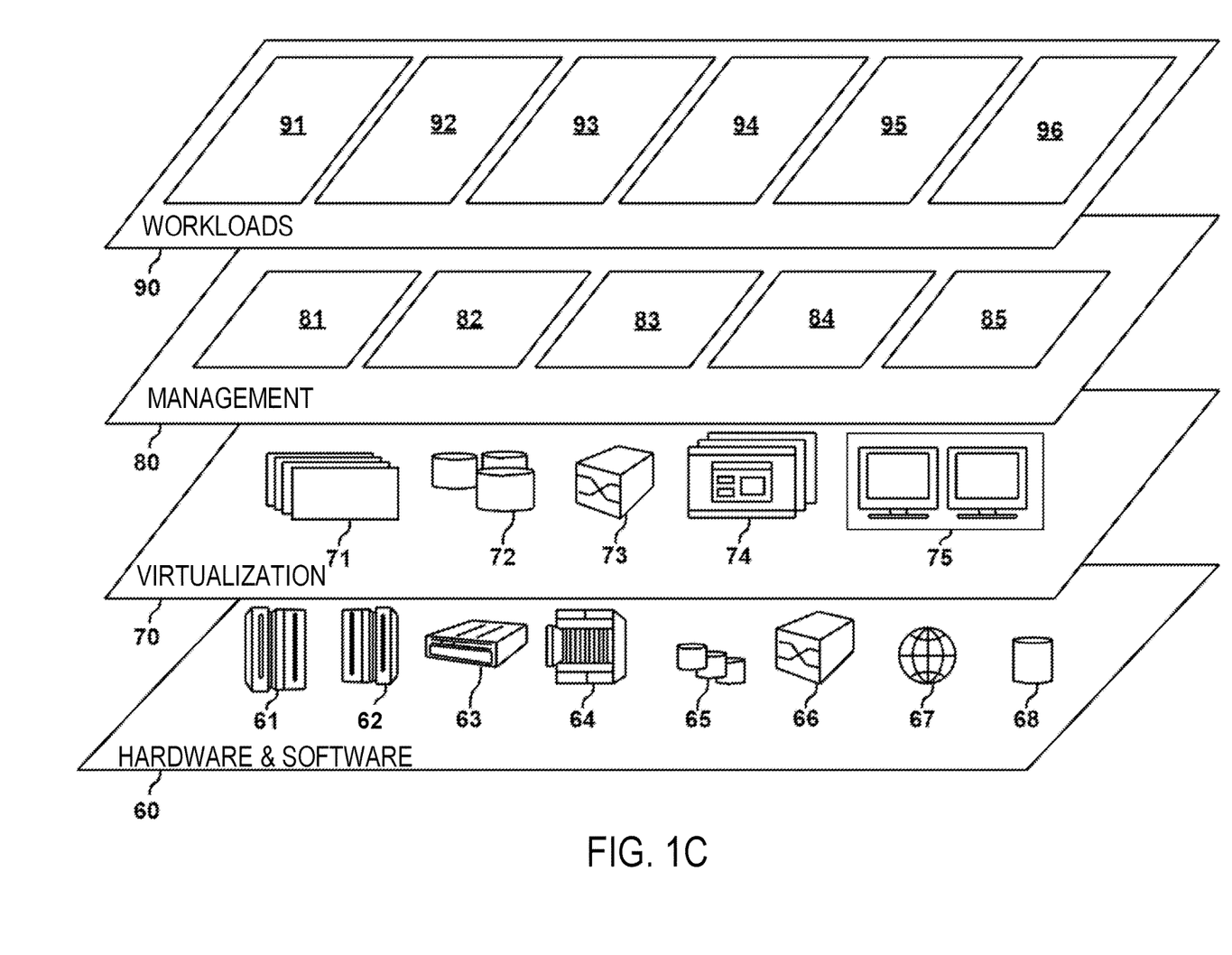
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Any of the nodes 50 in the computing environment 52 as well as the computing devices 54A-N may be a DPS 10.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Adaptive Network Slicing of Traffic Flows in a Secure Network

The following application-specific acronyms may be used below:

TABLE 2

Application-Specific Acronyms

| | |
|---|---|
| ACL | access control list |
| API | application program interface |
| CLI | command line interface |
| FQDN | fully-qualified domain name |
| FTP | File Transfer Protocol |
| IP | Internet Protocol |
| IT | information technology |
| NMS | network management system |
| ONF | Open Network Foundation |
| RBM | Restricted Boltzmann Machine |
| SBI | south-bound interface |
| SDN | software-defined networking |
| SFTP | SSH File Transfer Protocol |
| SNMP | Simple Network Management Protocol |
| SSH | Secure Shell |
| SVM | support vector machine |
| TCP | Transmission Control Protocol |
| TLS | Transport Layer Security |
| TN | Telnet |

Today's networks are becoming more complex and the interoperability between heterogeneous systems more difficult to achieve. The complexity of IT Infrastructure management is a result of the plethora of critical business services delivered across different types of infrastructure implementations, such as software as a service, public cloud, hybrid cloud solutions, and/or IoT networked devices. As the systems evolve to be more flexible and dynamic, network management becomes harder to manage and optimize without the ability to self-organize and learn. Adapting to the stringent demands of operating in such a complex environment can lead to better security incident detection, prevention and optimal recovery, and service continuity of business functions within the enterprise.

Disclosed herein are a system and method that use data-driven and model-based learning as a basis of self-organization and optimal resource allocation that is irrespective of underlying network infrastructure design. The method makes use of the programmability provided by a software-defined networking (SDN) controlled environment to provide an adaptive, security-aware, fair usage, and demand based, network resource allocation.

The SDN architecture may be used for classifying the network traffic generated by the client devices. The separation of the data plane and control plane is present in an SDN. In routing, the control plane refers to all functions and processes that determine which path to use to send a packet or frame. The control plane is responsible for populating a routing table, drawing network topology, forwarding the routing table, and hence enabling the data plane functions. In this case, the router makes the control decision. The control plane is responsible for how packets should be forwarded.

In routing, the data plane (also called a forwarding plane) refers to all functions and processes that forward packets/frames from one interface to another based on control plane logic. The routing table, forwarding table, and the routing logic constitute the data plane function. A data plane packet goes through the router, and the incoming and outgoing of frames are performed based on control plane logic. The data plane is responsible for moving packets from a source to a destination.

The most basic use of machine learning in the context of network traffic has been traffic flow classification. Identifying the protocol/type of traffic being sent on a certain flow has been developed as an alternative to traditional deep packet inspection and elementary port matching techniques.

Various nomenclature has evolved to define network traffic flow. "Traffic going northbound/southbound", refers to the traffic among clients and servers. Generally, the clients are considered to be at the north side, and servers at the south side. The northbound interface enables communication with the application plane. In a network, the application plane is the layer that has applications and services that make requests for network functions from the control plane and the data plane. In traditional networks, security, management, and monitoring devices or applications reside in the application layer.

According to some embodiments, the popular OpenFlow protocol is used as a southbound interface (SBI) for communication between the devices and the controller, which is defined by the Open Network Foundation (ONF). From the point of view of the controller, anything above (e.g., the service layer) is at the north of the controller, and anything below (e.g., the physical network) is at the south of controller. For an application programming interface (API), communicating between the controller and physical network is called a southbound API, and the API communicating between the service layer and the controller is called the northbound API. One popular northbound API is the RESTful Open Daylight project.

The SBI is a component's lower level interface layer. It is directly connected to that lower layer's northbound interface. It breaks down the concepts into smaller technical details that are specifically geared toward a lower layer component within the architecture. In software-defined networking (SDN), the southbound interface (SBI) serves as the OpenFlow or alternative protocol specification. It allows a network component to communicate with a lower-level component. The main objective of the SBI is to provide communication and management between the network's SDN controller, nodes, physical/virtual switches, and routers. It allows the router to discover the network topology, define network flow, and implement several requests relayed from northbound application programming interfaces (API). The management of network nodes is handled by the network management system (NMS) allowed by the SBI. The southbound integration may be supported by, e.g., the following interfaces: Simple Network Management Protocol (SNMP), command line interface (CLI), File Transfer Protocol (FTP) or SSH File Transfer Protocol (SFTP), and Telnet (TN) or Secure Shell (SSH).

The OpenFlow protocol is used for flow rules manipulation. The communication between the networking devices in the topology and the controller is carried out using the southbound interface. "Traffic going eastbound/westbound" refers to the traffic among the servers. The eastbound/westbound interface is used for communication between multiple controllers.

OpenFlow is a communications protocol that gives access to the forwarding plane of a network switch or router over the network, and is an example protocol, according to some embodiments described herein, that may be used for a rate-limiting algorithm as a form of decision making. OpenFlow enables network controllers to determine the path of network packets across a network of switches (the controllers are distinct from the switches). This separation of the control from the forwarding allows for more sophisticated traffic management than is feasible using access control lists (ACLs) and routing protocols. OpenFlow also allows switches from different vendors—often each with their own proprietary interfaces and scripting languages—to be managed remotely using a single, open protocol.

OpenFlow allows remote administration of a (networking) layer three switch's packet forwarding tables, by adding, modifying, and removing packet matching rules and actions. This way, routing decisions can be made periodically or ad hoc by the controller and translated into rules and actions with a configurable lifespan. These rules and actions may then be deployed to a switch's flow table, leaving the actual forwarding of matched packets to the switch at wire speed for the duration of those rules. Packets which are unmatched by the switch can be forwarded to the controller. The controller can then decide to modify existing flow table rules on one or more switches or to deploy new rules to prevent a structural flow of traffic between the switch and the controller. The controller can even decide to forward the traffic itself, provided that it has told the switch to forward entire packets instead of just their header.

The OpenFlow protocol is layered on top of the Transmission Control Protocol (TCP) and prescribes the use of Transport Layer Security (TLS). Controllers should listen on TCP port 6653 for switches that want to set up a connection. Earlier versions of the OpenFlow protocol unofficially used port 6633. Some network control plane implementations use the protocol to manage the network forwarding elements. OpenFlow is mainly used between the switch and controller on a secure channel.

The Open Networking Foundation (ONF), manages the OpenFlow standard and defines OpenFlow as the first standard communications interface defined between the control and forwarding layers of an SDN architecture. OpenFlow allows direct access to and manipulation of the forwarding plane of network devices, such as switches and routers, both physical and virtual (hypervisor-based). It is the absence of an open interface to the forwarding plane that has led to the characterization of today's networking devices as monolithic, closed, and mainframe-like. A protocol like OpenFlow has allowed movement of network control out of proprietary network switches and into control software that is open source and locally managed.

Figure 2:
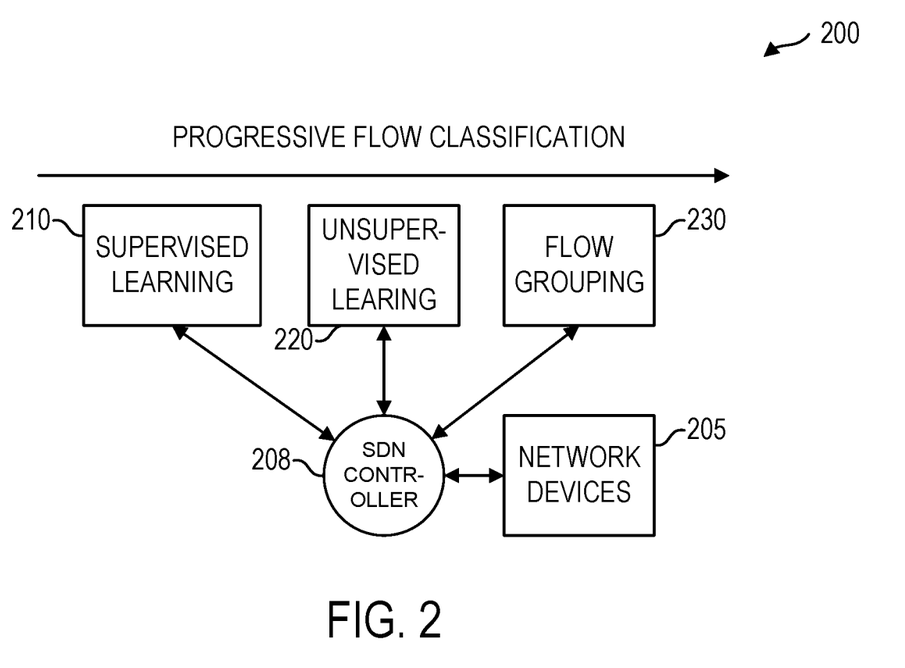
FIG. 2 is a block diagram illustrating the progressive network traffic flow classification and grouping, according to some embodiments disclosed herein.

FIG. 2 is a block diagram illustrating an embodiment of a system 200 that is connected to network devices 205 for machine learning based flow classification and its integration with an SDN controller 208. The system 200 leverages three methods of machine learning that follow a progressive flow classification and allow the SDN controller 208 to make better decisions. The three methods of machine learning are: supervised learning 210 for identifying the underlying traffic of each flow for known flows, unsupervised learning 220 for clustering flows in order to identify unknown flows, and flow grouping 230 for determining groupings of flows that are seen together within the network. The flow grouping itself may be considered as another form of classification at a grouping level that may be subject to a similar supervised and unsupervised learning mechanism as described herein.

With the supervised learning 210, labeled datasets of flows may be used to train algorithms into classifying flows or predicting outcomes accurately. In supervised learning, the algorithm "learns" from the training dataset of flows by iteratively making predictions on the data and adjusting for the correct answer. Using labeled inputs and outputs, the model can measure its accuracy and learn over time. According to some embodiments, the supervised learning can act as a classifier that uses an algorithm to accurately assign test data (known network flows) into specific categories. In various embodiments, the categorization may make use of, e.g., linear classifiers, support vector machines, decision trees, and random forest classification algorithms.

With the unsupervised learning 220, machine learning algorithms are used to analyze and cluster unlabeled data sets. Unsupervised learning models work on their own to discover the inherent structure of unlabeled data. These algorithms may be used to discover hidden patterns in data without the need for human intervention, and may be used for, e.g., clustering and association. In clustering, unlabeled data may be grouped based on their similarities or differences. For example, K-means clustering algorithms assign similar data points into groups, where the K value represents the size of the grouping and granularity. In association, different rules are used to find relationships between variables in a given dataset.

At the end of the supervised learning 210 and the unsupervised learning 220, the system has classified individual flows. In the flow grouping 230, similarly-classified individual flows that are related to one another, e.g., temporally or according to some other criteria, may be processed into flow groups that may be controlled in a particular and advantageous manner.

Figure 3:
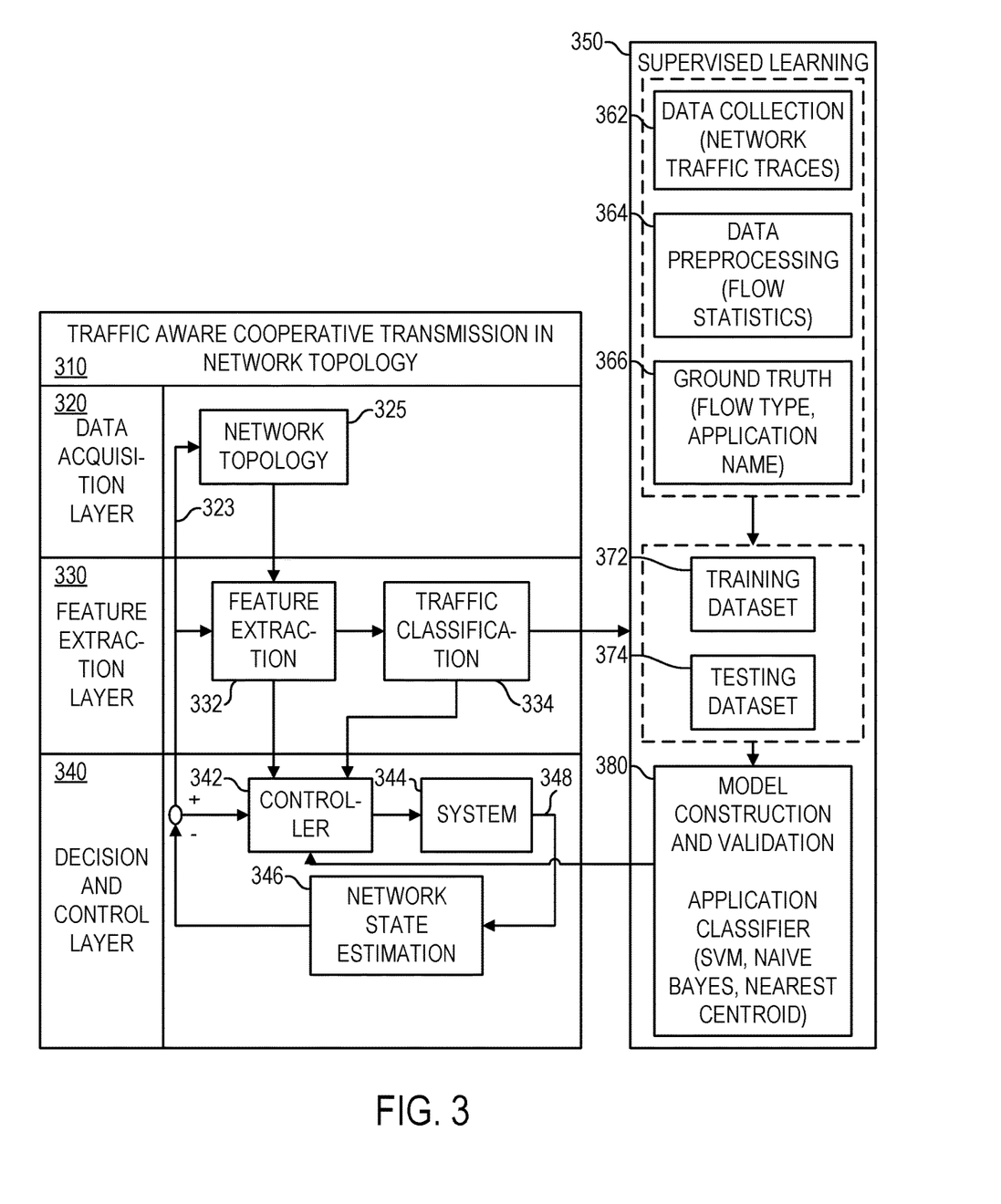
FIG. 3 is a block diagram of traffic aware cooperative transmission in network topology and supervised learning, according to some embodiments disclosed herein.

FIG. 3 is a block diagram that illustrates an example embodiment of traffic aware cooperative transmission in network topology 310 and the supervised learning 350 (210). The network topology 310 may be broken down into, e.g., three layers: a data acquisition layer 320, a feature extraction layer 330, and a decision and control layer 340.

The workflow for the network traffic classification includes, within the supervised learning 350, data collection 362 (from network traffic traces), data pre-processing 364 (flow statistics), labelling in a ground truth process 366 (e.g., flow type, application name, etc.), model construction and validation 380, and prediction. In a training phase, a training dataset 372 may be used, and then the model may be tested using a testing dataset 374.

Here, the northbound interface is used for communication between network applications and the controller. An application classifier may utilize a Support Vector Machine (SVM), naïve Bays, or Nearest Centroid algorithms. "Support Vector Machine" (SVM) is a supervised machine learning algorithm that can be used for both classification and regression challenges. Support Vectors are the coordinates of individual observation. The SVM classifier is a frontier that best segregates the two classes (hyper-plane/line). Naïve Bayes classifiers are a family of simple "probabilistic classifiers" based on applying Bayes' theorem with strong (naïve) independence assumptions between the features. They are among the simplest Bayesian network models, but coupled with kernel density estimation, they can achieve higher accuracy levels. Naïve Bayes classifiers are highly scalable, requiring a number of parameters linear in the number of variables (features/predictors) in a learning problem. Maximum-likelihood training can be done by evaluating a closed-form expression, which takes linear time, rather than by expensive iterative approximation as used for many other types of classifiers. In machine learning, a nearest centroid classifier or nearest prototype classifier is a classification model that assigns to observations the label of the class of training samples whose mean (centroid) is closest to the observation. An extended version of the nearest centroid classifier has found applications in the medical domain, specifically classification of tumors. The algorithm for the nearest centroid classifier is as follows:

Training procedure: given labeled training samples $\{(\vec{x}_1, y_1), \ldots, (\vec{x}_n, y_n)\}$ with class labels $y_i \in Y$, compute the per-class centroids $$\vec{\mu}_l = \frac{1}{|C_l|} \sum_{i \in C_l} \vec{x}_i$$

where $C_l$ is the set of indices of samples belonging to class $l \in Y$,

Prediction function: the class assigned to an observation $\vec{x}$ is $y = \arg\min_{l \in y} \|\vec{\mu}_l - \vec{x}\|$.

The adaptive controller 342, along with data analytics, provides appropriate control commands and handles network dynamics. A feedback mechanism 323 in the data provides the updates in the network topology 325 that gathers information about the organization of the network and the entities/devices (routers, switches, network interface cards (NICs), etc.) that are contained within it. This feedback mechanism 323 may provide data like link failures or topology changes in the form of the network state information from the network state estimation 346 in the decision and control layer 340. The data acquisition layer 320 enables the collection of network topology information that may be utilized for the control of network data flow. The plus and minus at the summation reflect a feedback mechanism for an increase and decrease in the priority of the used models.

The feature extraction layer 330 comprises the feature extraction algorithm 332 that scans the network flows and extracts relevant flow and state information that can be obtained from them. The feature extraction layer 330 also comprises that training models and AI algorithms for network traffic classification 334. The network dynamics in the topology are gathered and sent to the controller 342 for decision making and management of the network devices. The extracted information from the feature extraction 332 and traffic classification 334 is made available to the controller 342 for decision making.

Figure 4:
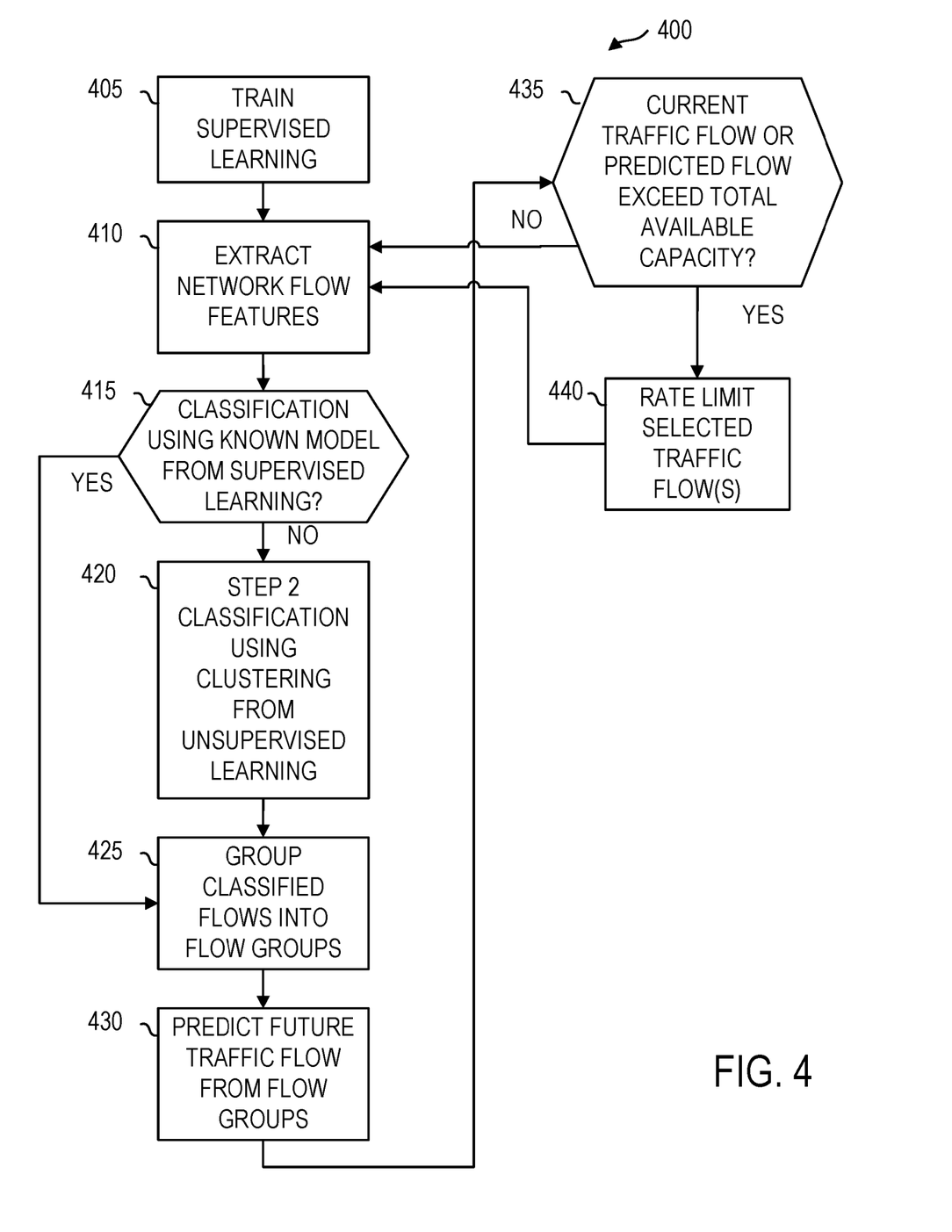
FIG. 4 is a flowchart of a process for adaptive network control of traffic flows, according to some embodiments disclosed herein.

FIG. 4 is a flowchart of a process 400 for adaptive network control of traffic flows, according to some embodiments. In operation 405, the supervised learning 250 is initially trained using the training dataset 272 and tested with the testing dataset 274 to establish known traffic flows. When the system is running, in operation 410, the network traffic flows are collected and features are extracted as side information. The traffic flow data and/or and the side information are, in operation 415, provided to the first type of classification is based on pretrained network flow models for supervised learning 210, 250. If a traffic flow matches one of these pretrained models (415:YES), an event may be triggered to the SDN controller 208, 342 notifying it that the flow was classified as being of a certain type.

Figure 5:
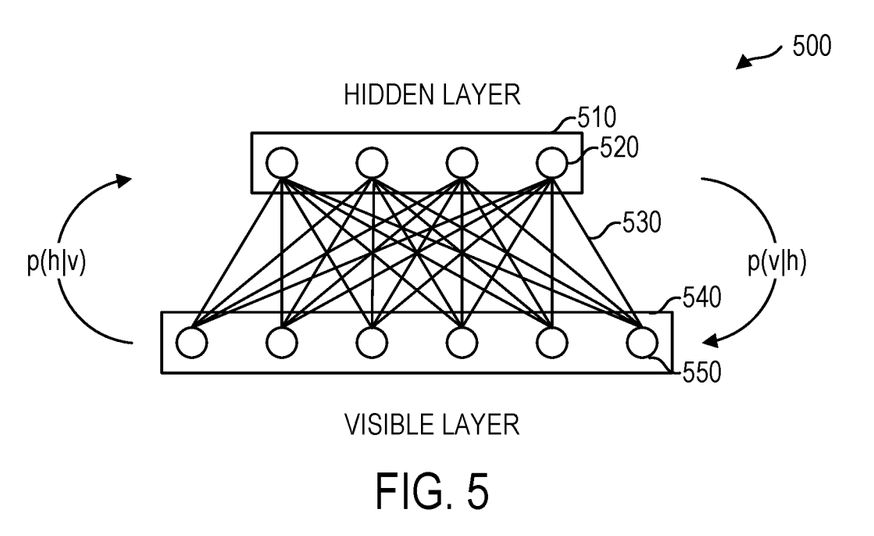
FIG. 5 is an undirected graph including two layers of neurons, according to some embodiments disclosed herein.

In case the traffic flow cannot be matched against a model (415:NO), an event may again be triggered to the SDN controller 208 informing it that the flow was not matched against any known model. In this case, in operation 420, the SDN controller 208 may then proceed to forward the traffic flow information to the second classification step, namely unsupervised learning 220. The unsupervised learning 220 builds on the algorithm for supervised learning 210. The SDN controller 208 may add the unclassified traffic flows to an unmatched traffic flow queue queue, and when a sufficient number of flows are available (e.g., a number of traffic flows in the unmatched traffic flow queue exceeds a predetermined queue value), based on, e.g., a predefined threshold, the unsupervised learning (algorithm) 220 may be triggered, and the unsupervised learning 220 may run, e.g., a clustering algorithm. An example implementation for the unsupervised learning 220 module, which may be implemented according to some embodiments, uses a Restricted Boltzmann Machine (RBM). An RBM is a stochastic neural network whose structure, represented in FIG. 5, can be interpreted as an undirected graph 500 including two layers (hidden layer 510, and visible layer 540) of neurons (hidden layer neurons 520 and visible layer neurons 550, connected via interconnects 530). The output from this algorithm is a set of clusters.

Since the flows will all have associated a partial match from the first round of supervised learning, for each group of flows, a majority partial match may also be deduced. This is the case were traffic that does not fall exactly in any group needs to be aligned with existing groups. For such cases, the nearest model is found based on model definition criteria variation.

Up to this point, the process 400 has only classified individual flows using supervised learning 210 and unsupervised learning 220. However, what is generally observed in the network is that groups of related flows occur between nodes when a certain business or human operation is taking place. It is thus desirable to identify these flow groups, as is done in operation 425.

In operation 425, in order identify these flow groups, additional side information (meta information) may be introduced into the flow group identification. This side information may be obtained in the form of, e.g., layer three source and destination internet protocol (IP) addresses, layer four source and destination ports, and source and destination fully-qualified domain names (FQDNs). This side information may further include a time interval in which each traffic flow was observed.

One such traffic flow grouping pattern arises when multiple nodes are connecting and executing the same communication flows against the same node in the same time interval, indicating that the destination node is hosting a common service on the network. This pattern can be detected by grouping flows classified as being of the same type by destination IP and port and, in each group, sorting the flows based on their start time. Having the flows sorted by start time, the flows may be selected that are within a certain threshold time interval. These selected and grouped flows may thus form a detected pattern.

Once this type of pattern is detected, in operation 430, the detected pattern in the group flow may be used to make a prediction. Such a prediction may be, e.g., that if a certain type of traffic flow is executed against a destination service, then, in that time interval, another N traffic flows will be executed against the same service. The situation may also be detected where a single source node is connecting to multiple destination nodes and executes a same communication flow against them in the same time interval. Thus, based on initially detected traffic flows and traffic flow groups in a first time interval, predictions may be made (and learned) as to the likely traffic flows to follow in a second time interval, which may help to plan for efficient operation of the network.

In operation 435, having detected a pattern, as described above, this pattern may be used to predict, e.g., that if a certain source node has executed a specific type of communication traffic flow, then it will likely execute N more traffic flows of the same type. Each of the flow group segment characteristics (i.e., peak network utilization rate as a function of time) may define an allocated network slice of the total available network resources for each of the allowed established flow groups so that the slices add up to one (total available capacity—this capacity may be either a physical capacity or a service-level-based capacity).

However, it may turn out (435:YES) that a predicted traffic flow may exceed the total available capacity, in which case it may be beneficial, in operation 440, to rate-limit one or more certain selected traffic flows. In another situation, a breach of the norm utilization patterns for the traffic flow group may be detected by the SDN controller 208, 342. In these situations, the SDN controller 208, 342 may enforce rate limiting in the next evaluation period for the offending group flow related flows. This allows the expected group flow utilization rate to converge to the expected average over a pre-defined set of periods.

A rate-limiter may be used to control the rate of packets passing through a switch. Per-flow rate-limiters associate an arbitrary number of flows with a rate-limiter. Using OpenFlow with per flow rate-limiters, any number of flows can be flexibly mapped to a rate-limiter, regardless of their source and destination ports. Rate-limiters can be used via the SDN controller. Rate-limiters may be addressed, e.g., by a limiter id, which may be an arbitrary 32-bit number. Configuration of rate-limiters may be done through a simple message from the controller that can add, modify, or remove a rate-limiter, and flows may be directed to rate-limiters through an action—multiple flows may be associated with the same rate-limiter. Statistics may be read from the OpenFlow controller for each rate-limiter.

To extend this concept, a network slice augmentation that was present in a first timeframe may be adjusted in subsequent timeframes for a given group flow in the long term by minimizing the network slice for n periods. If the offending group flow deviates from expected (or required) utilization rates, the SDN controller 208, 342 may use a minmax strategy so that a continuous reward value is no better than in the case where the flow group would have operated within the expected network slice.

In the context above, the OpenFlow based rate limiting algorithm described in this section may comprise two procedures.

STEP 1: A SET-SLICE-LIMIT algorithm may be used for invoking metering with a specified Flow ID in a corresponding flow table. By default, a meter table is optional for a flow table. The group flow behaving normally will not face any decreased bandwidth (435:N). However, if the group flow is bypassing its network slice allocation and a trigger event based on SDN controller network live monitoring alert is used to invoke metering with ID 1, the bandwidth may be set to a value decided by a rate limit policy, depending upon current levels of bypass for a pre-allocated network slice in the subsequent time frames.

Code Listing 1
Setting a Slice Limit

```
1: STEP1 Set-Slice-Limit (FlowName, bandID, bandRate)
2: FlowName ← this.FlowName
3: n-slice ← MeterBuilder.meterBandHeader( )
4: n-slice.setBandID(this.bandID)
5: n-slice.setBandRate(this.bandRate)
```

STEP 2: A RATE-LIMIT algorithm loops through all group flow tables in invoking metering with a rate-limiting threshold if a matching source group flow is found in the list of higher than the allowed network slice utilization vs allocation. The procedure of re-equilibrium may be carried out for k instances of time where value of k is determined by the extent with which the pre-allocated network slice was breached.

Code Listing 2
Rate Limiting for Group Flow Tables

```
6: STEP2 Rate-Limit( )
7: u(expected, expected) ← n-slice
8: u(expected, breach) ← {n-slice-1 > n-slice}
9: u(breach, expected) ← {n-slice-2 < Network}
10: u(breach, breach) ← {n-slice-3 < n-slice-2}
11: for i in timeframes:
12: ft ← FlowTable
13: if ft in observed_slice_breaches:
14: x ← ft.Instruction( )
15: x.SET-SLICE-LIMIT ("FlowN", 1, u(min, expected))
16: else
17: x.SET-SLICE-LIMIT ("FlowN", 1, u(min, min))
```

TECHNICAL APPLICATION

The one or more embodiments disclosed herein accordingly provide an improvement to computer technology. For example, an improvement to network communications between computers allows for more efficient and effective computer transactions.

What is claimed is:
1. A method for rate limiting in a network, comprising:
receiving a traffic flow from the network;
in a supervised learning phase:
  determining if the traffic flow matches a pretrained network flow model;
  conditioned upon the traffic flow matching the pretrained network flow model:

designating the traffic flow as a classified traffic flow according to the pretrained network flow model using a network traffic flow classifier;
advancing to a grouping phase;
conditioned upon the traffic flow not matching pretrained network flow models, advancing to an unsupervised learning phase;
in the unsupervised learning phase that follows the supervised learning phase:
designating the traffic flow as a classified traffic flow according to a clustering analysis on the traffic flow and previous traffic flows;
wherein the supervised learning phase and the unsupervised learning phase result in classified individual traffic flows;
in the grouping phase that follows the supervised learning phase and the unsupervised learning phase:
using side information about the traffic flows to assign related traffic flows into traffic flow groups;
identifying a particular traffic flow group from the traffic flow groups as being an offending traffic flow group;
enforcing rate limiting in a next evaluation period for the offending traffic flow group.

2. The method of claim 1, wherein the clustering analysis comprises using a Restricted Boltzmann Machine as an undirected graph that includes at least two layers of neurons, including a visible layer and a hidden layer, wherein a graph input comprises network flow characteristics and metadata, and a graph output comprises a model definition.

3. The method of claim 1, wherein the unsupervised learning phase further comprises:
adding the traffic flow to an unmatched traffic flow queue;
determining if a number of traffic flows in the unmatched traffic flow queue exceeds a predetermined queue value;
conditioned upon the number of traffic flows exceeding the predetermined queue value, performing the clustering analysis.

4. The method of claim 1, wherein the side information comprises Internet Protocol addresses, source and destination ports, and source and destination fully-qualified domain names.

5. The method of claim 1, wherein:
the network is a software-defined network; and
a southbound interface (SBI) between a network controller and a network device uses an OpenFlow protocol.

6. The method of claim 5, wherein the SBI is supported by a Simple Network Management Protocol (SNMP), command line interface (CLI), File Transfer Protocol (FTP), SSH File Transfer Protocol (SFTP), and Telnet (TN), and Secure Shell (SSH).

7. The method of claim 1, wherein the enforcing of the rate limiting comprises updating, by a controller, a flow table rule on a switch via a communication channel between the controller and the switch.

8. The method of claim 1, wherein the network traffic flow classifier is selected from the group consisting of a Support Vector Machine (SVM), naïve Bays, and a Nearest Centroid algorithm.

9. The method of claim 1, wherein the determining if the traffic flow matches a pretrained network flow model comprises performing feature extraction from the traffic flow.

10. The method of claim 1, further comprising updating a network topology from a feedback mechanism that gathers information about an organization of the network and entities that are contained within the network.

11. The method of claim 1, further comprising training the supervised learning with a training data set.

12. The method of claim 1, wherein the side information comprises an Internet Protocol address and a port number.

13. The method of claim 12, wherein the side information further comprises a predefined time interval threshold.

14. The method of claim 1, wherein the identifying of the particular traffic flow group comprises:
predicting a second traffic flow from the particular traffic flow group; and
designating a subsequent traffic flow group related to the particular traffic flow group as an offending traffic flow group if it exceeds a total available capacity.

15. The method of claim 1, wherein the enforcing rate limiting comprises a SET-SLICE-LIMIT algorithm and a RATE-LIMIT algorithm.

16. A system, the system comprising:
a memory, the memory containing one or more instructions; and
a processor, the processor communicatively coupled to the memory, the processor, in response to reading the one or more instructions, configured to:
receive a traffic flow from the network;
in a supervised learning phase:
determine if the traffic flow matches a pretrained network flow model;
conditioned upon the traffic flow matching the pretrained network flow model:
designate the traffic flow as a classified traffic flow according to the pretrained network flow model using a network traffic flow classifier;
advance to a grouping phase;
conditioned upon the traffic flow not matching pretrained network flow models, advance to an unsupervised learning phase;
in the unsupervised learning phase that follows the supervised learning phase:
designate the traffic flow as a classified traffic flow according to a clustering analysis on the traffic flow and previous traffic flows;
wherein the supervised learning phase and the unsupervised learning phase result in classified individual traffic flows;
in the grouping phase that follows the supervised learning phase and the unsupervised learning phase:
use side information about the traffic flows to assign related traffic flows into traffic flow groups;
identify a particular traffic flow group from the traffic flow groups as being an offending traffic flow group; and
enforce rate limiting in a next evaluation period for the offending traffic flow group.

17. The system of claim 16, wherein the processor is further configured to, in the unsupervised learning phase:
add the traffic flow to an unmatched traffic flow queue;
determine if a number of traffic flows in the unmatched traffic flow queue exceeds a predetermined queue value;
conditioned upon the number of traffic flows exceeding the predetermined queue value, perform the clustering analysis;
wherein the side information comprises Internet Protocol addresses, source and destination ports, and source and destination fully-qualified domain names.

18. The system of claim 16, wherein:
the enforcement of the rate limiting comprises the processor executing instructions to perform an update, by a controller, of a flow table rule on a switch via a communication channel between the controller and the switch;

the network traffic flow classifier is selected from the group consisting of a Support Vector Machine (SVM), naïve Bays, and a Nearest Centroid algorithm; and the determination of whether the traffic flow matches a pretrained network flow model comprises the processor performing feature extraction from the traffic flow.

19. A computer program product, the computer program product comprising:

one or more computer readable storage media; and program instructions collectively stored on the one or more computer readable storage media, the program instructions configured to:

receive a traffic flow from the network;

in a supervised learning phase:
determine if the traffic flow matches a pretrained network flow model;
conditioned upon the traffic flow matching the pretrained network flow model:
designate the traffic flow as a classified traffic flow according to the pretrained network flow model using a network traffic flow classifier;
advance to a grouping phase;
conditioned upon the traffic flow not matching pretrained network flow models, advance to an unsupervised learning phase;

in the unsupervised learning phase that follows the supervised learning phase:
designate the traffic flow as a classified traffic flow according to a clustering analysis on the traffic flow and previous traffic flows;

wherein the supervised learning phase and the unsupervised learning phase result in classified individual traffic flows;

in the grouping phase that follows the supervised learning phase and the unsupervised learning phase:
use side information about the traffic flows to assign related traffic flows into traffic flow groups;
identify a particular traffic flow group from the traffic flow groups as being an offending traffic flow group; and
enforce rate limiting in a next evaluation period for the offending traffic flow group.

20. The computer program product of claim 19, wherein the instructions further cause the processor to:

update a network topology from a feedback mechanism that gathers information about an organization of the network and entities that are contained within the network; and train the supervised learning with a training data set;

wherein:

the side information comprises an Internet Protocol address and a port number;

the side information further comprises a predefined time interval threshold; and the identifying of the particular traffic flow group comprises computer instructions that cause the processor to:
predict a second traffic flow from the particular traffic flow group; and
designate a subsequent traffic flow group related to the particular traffic flow group as an offending traffic flow group if it exceeds a total available capacity.

* * * * *